Nov. 18, 1952     J. A. FRISCHMANN     2,618,490
MULTIPLE ROLLER FORK ASSEMBLY FOR MOTORIZED PALLETS
Filed Jan. 26, 1949
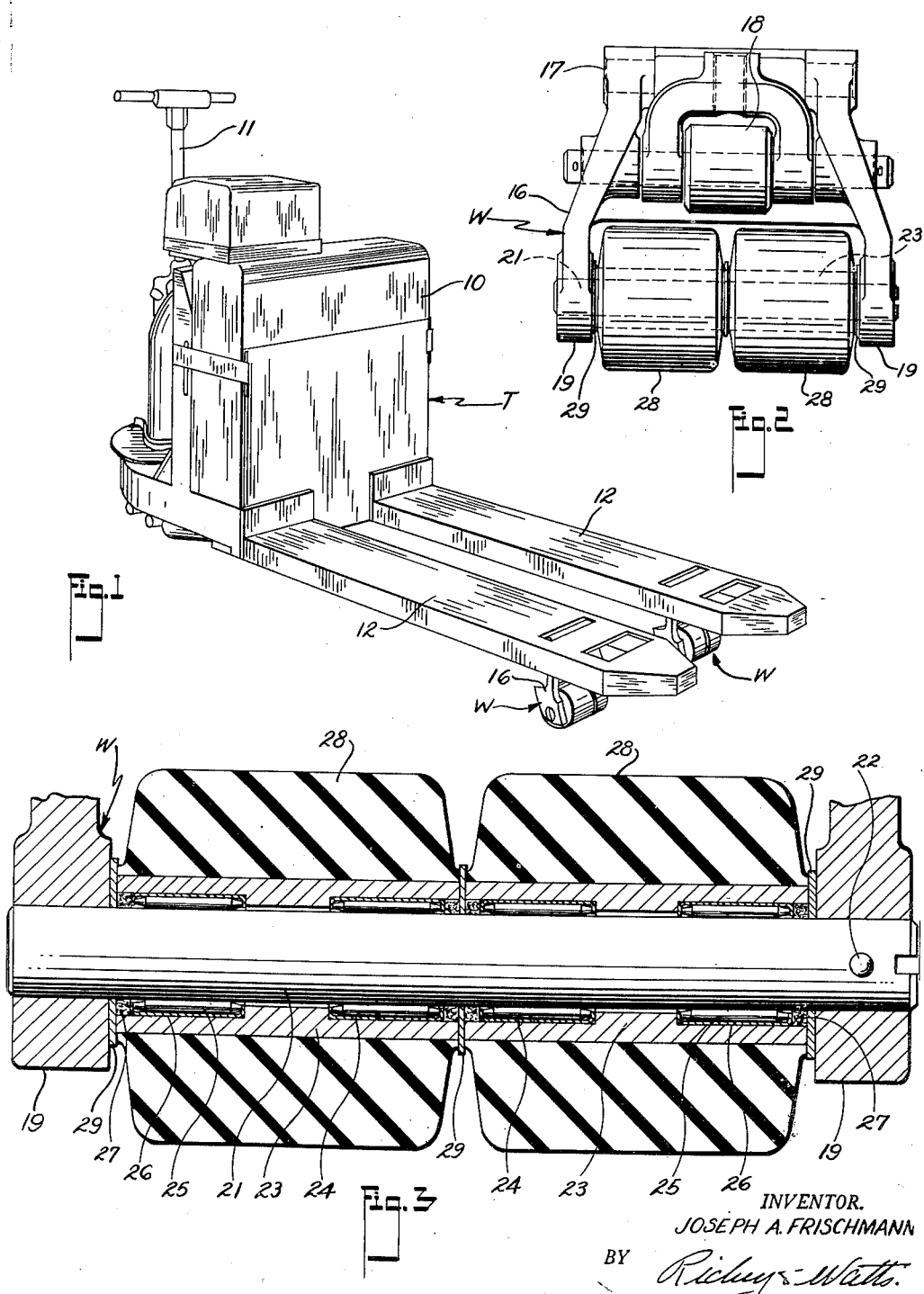
INVENTOR.
JOSEPH A. FRISCHMANN
BY
ATTORNEYS Patented Nov. 18, 1952

2,618,490

UNITED STATES PATENT OFFICE 2,618,490

MULTIPLE ROLLER FORK ASSEMBLY FOR MOTORIZED PALLETS

Joseph A. Frischmann, Cleveland, Ohio, assignor to Towmotor Corporation, Cleveland, Ohio, a corporation of Ohio Application January 26, 1949, Serial No. 72,967

1 Claim. (Cl. 280—44)

This invention relates to vehicle wheels and their assembly, and, more particularly, to wheels or rollers for the support of the forward end of the platform of a pallet-transporting motorized hand truck.

The load-supporting or pallet-carrying platforms of trucks of the class referred to are necessarily mounted close to the floor or ground, the result being that the forward wheels, which are directly under the platform, must be of relatively small diameter. For example, it is common practice to support the forward platform on a pair of rollers approximately three inches in diameter and six inches long, the relatively great length being necessary to distribute the load over an adequate area.

Vehicles of this type are steered by means of a single rear wheel which also acts as the driving wheel. Since the forward wheels of such vehicles are mounted on jack members, they cannot be swiveled to facilitate steering or turning of the vehicle. Accordingly, when the vehicle is turned a severe abrading, twisting, and scuffing action is exerted on the periphery of the wheels. As a result of this severe service condition, it has been customary to provide steel wheels or rollers for the support of the forward platform, such wheels being capable of resisting the severe scuffing action without deterioration. However, steel wheels have several disadvantages in actual service. They tend to mar the floor or other surface negotiated by the vehicle, they provide no shock-absorbing action, they impose strains on the vehicle, they tend to jar the loads carried thereby, and their use is attended with objectionable noise.

The advantages of cushion tires, that is, tires made of solid rubber or a like material vulcanized to a rib or hub, are well known in the vehicle art. Manifestly, the use of such tires in connection with a pallet truck will eliminate the disadvantages referred to resulting from the use of steel-tired wheels. Attempts have been made to replace the steel-tired wheels with rollers having rubber cushion tires, but the resulting construction has been entirely unsatisfactory. It has been found that when such rollers were placed in service, particularly when heavy loads were imposed thereon, the life thereof was so short that they were universally deemed economically useless. Thus, prior to this invention such attempts as have been made to provide rubber-tired rollers have been abandoned and the trade has been forced to continue with the undesirable steel rollers.

The primary object of the invention is to secure the advantages of rubber-tired rollers and at the same time attain long wear in service. This is accomplished in the preferred embodiment of the invention through the provision of a plurality of narrow, rubber-tired wheels mounted between the forks for independent rotation relative to each other. Hardened and ground thrust washers or anti-friction bearings are preferably provided between the outer wheels or rollers and the fork, and between the hubs of the contiguous wheels. With this construction the torsion and twisting action imposed on the tires will be greatly reduced and the life thereof proportionally increased.

Breakdown tests have been made upon vehicles equipped with rubber-clad rollers embodying the present invention and comparative tests have also been run on the long unitary rollers proposed by prior workers in the art. These tests show superior results not only in the ease of operation of the vehicle, but, in addition, an unexpected increase in service life of the improved wheel assemblies. The nature and result of this test will be set out in detail after the structural details of the preferred embodiment of the invention are described.

In the drawings:

Fig. 1 is a perspective view of the hand-operated, motorized truck embodying the invention;

Fig. 2 is a front elevation of one of the roller assemblies including the fork; and Fig. 3 is an enlarged partial section of the roller assembly.

The truck T shown in Fig. 1 is of a type well known in the material-handling art. The vehicle comprises, generally, a drive assembly 10 including batteries, an electric motor, and a single steering wheel driven by the motor. The details of the drive wheel and power transmission mechanism therefor are well known in the art, and a further description thereof is deemed unnecessary herein. The truck is steered by a handle 11 which is generally provided with certain control elements for the operation of the vehicle.

The end of the truck is formed with a pallet-supporting platform 12 which, when adjusted to its lowered position, may be introduced beneath a pallet in the usual manner. A pair of non-steerable wheel assemblies W are mounted adjacent the forward end of the platform 12. The wheel assemblies include a pair of fork members 16 mounted for pivotal movement in a vertical plane upon pins 17. The forks are connected, intermediate their ends, with linkage 18 coupled with a jack to facilitate the elevation of the pallets incident transportation thereof. The jack and elevating linkage associated therewith are of the design commonly employed in vehicles of this type and form no part of the present invention. The forks are formed with bosses 19 in the free ends thereof which are drilled for the reception of axles 21 retained in place by pins 22.

It has been found that the life of the rollers is greatly increased through the provision of a plurality of independently rotatable rollers in each of the forks. In practice, adequate life is obtained when two wheels or rollers are mounted in the fork, although it will be understood that the invention is not limited in its broader aspects to the use of any given number of units. In the preferred embodiment each of the rollers is formed with a hub member 23 machined for running clearance on the axle 21 and counterbored in the end portions 24 for the reception of needle bearings 25 supported in the customary manner in cages 26. Packing rings 27 constituting a dust seal are preferably mounted in the outer ends of the counterbores adjacent the ends of the bearings. The cushion tire 28 is vulcanized to the hub in the manner well known in the art, and is preferably composed of rubber of the type employed in tire tread stock.

It has been found that during turning operations of the vehicle as effected by manipulation of the rear driving wheel considerable side thrust is imposed upon the rollers in the fixed wheel assemblies W. Since it is important that the contiguous rollers be mounted for free independent rotation, hardened steel thrust washers 29 are interposed therebetween and adjacent the inner face of the forks 16. This construction affords all the advantages of a cushion-tire wheel, yet provides an adequate service life.

During development of the invention, breakdown tests were conducted upon both a single rubber-clad roller and the dual wheel assembly. In these tests a 5,000 pound load was placed upon the platform of the truck and the wheels adjusted to their operative position. The vehicle was put into motion and steered to describe a figure eight of the smallest turning radius possible for the truck. This subjected the rollers to severe twisting and scuffing conditions, much greater than that normally imposed thereon in actual service. It will be readily recognized that a few minutes of this type of operation is the equivalent of many hours of normal operation. Under these conditions, the long single rubber-tired roller was destroyed in forty-eight minutes of service, the speed of the truck being such as to produce a total of 9,460 feet of travel. The frictional resistance upon the rollers in this test caused the portions thereof that were subjected to the greatest arcuate translation to twist or wind the rubber about its axis while the opposed end of the long roller was torsioned in a vertical plane. As the direction of the vehicle was changed the torque strains were reversed and a severe lateral thrust was imposed upon the rubber through the length of the roller. At the completion of the test the full width roller unit was completely destroyed. A circumferential layer of the tread was peeled and twisted from the major periphery of the roller. The rubber was not stripped from the hub within the bonded area but was split and torn within the body thereof so that bands of the material entirely separated from each other clung to the shell, leaving only a small coating of the vulcanized rubber about the hub.

When the same test was conducted with the roller assemblies formed in accordance with the invention, the service was satisfactorily prolonged for four hours (240 minutes), during which time the truck had travelled 53,040 feet. Thus it will be recognized that by forming an assembly so that the wheel which travels through the greatest arc may rotate independent of the wheel that traverses the smaller arc, less frictional resistance will be encountered, less wear and scuffing will occur, and a smaller mass of material will be subjected to the deleterious torsional strain imposed thereon. The increase in the life of the improved wheel or roller is so great that it represents the determining factor as to whether or not rubber tires can be used commercially. The service life equivalent of the forty-eight minute test for the single-unit roller proves the use of such a roller economically impractical, whereas the service life of the dual wheel or multi-roller assembly assures the commercial success thereof.

As a result of the present invention, motorized lift trucks may be employed to carry heavy loads noiselessly and safely over all types of floors or other surfaces without damage thereto and with a service life comparable to that of other rubber-tired vehicles.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

An articulated-roller assembly for a motorized pallet transporting hand truck comprising a fork, pivot means for mounting said fork on the truck for motion in a vertical plane only, an axle mounted in said fork parallel to said pivot means, thin-walled tubular metallic hub sleeves on said axle, a needle bearing at each end of each sleeve for rotatably carrying the sleeve on the axle, a rubber cushion tire of small diameter relative to the width thereof vulcanized to each hub sleeve, said sleeves extending axially past the major part of the side walls of the tires, and thrust bearings between the sleeves and said fork and between adjacent ends of said sleeves, whereby each portion of the roller is free to rotate relative to other portions thereof when the direction of movement of the truck is changed.

JOSEPH A. FRISCHMANN.

REFERENCES CITED

The following references are of record in the file of this patent:

UNITED STATES PATENTS

| Number | Name | Date |
|---|---|---|
| 1,072,818 | Buckwalter | Sept. 9, 1913 |
| 1,900,101 | Frank | Mar. 7, 1933 |
| 2,242,454 | Cochran | May 20, 1941 |
| 2,274,164 | Quayle | Feb. 24, 1942 |
| 2,436,757 | Lewis | Feb. 24, 1948 |